United States Patent [19]

Tamai et al.

[11] Patent Number: 4,980,454

[45] Date of Patent: Dec. 25, 1990

[54] POLY(ARYLENE CYANO-THIOETHER) COPOLYMER AND PREPARATION THEREOF

[75] Inventors: Tomoji Tamai; Tetsuya Asahi; Yozo Kondo, all of Mie, Japan

[73] Assignee: Tosoh Corporation, Yamaguchi, Japan

[21] Appl. No.: 338,024

[22] Filed: Apr. 14, 1989

[30] Foreign Application Priority Data

Apr. 15, 1988 [JP]  Japan .................................. 63-91596
Mar. 16, 1989 [JP]  Japan .................................... 1-62174

[51] Int. Cl.$^5$ ........................ C08G 75/16; C08G 63/44
[52] U.S. Cl. ................................... 528/362; 528/360; 528/364
[58] Field of Search ....................... 528/362, 364, 360

[56] References Cited

U.S. PATENT DOCUMENTS 3,987,016 10/1976 Haddad et al. ................... 260/79.1
4,440,915  4/1984 Asakura et al. ..................... 525/537

OTHER PUBLICATIONS

Chemical Abstracts, vol. 86, No. 4, 1/24/77, 17308e.
Patent Abstracts of Japan, vol. 11, No. 202 (C-432)(2649), 6/30/87.
Annex to European Search Report.

*Primary Examiner*—Harold D. Anderson
*Attorney, Agent, or Firm*—Sughrue, Mion, Zinn, Macpeak & Seas

[57] ABSTRACT

Reaction of a dihalogenobenzonitrile and a dihalogenobenzene with a thioetherifying agent provides a poly(arylene thioether) copolymer which is both thermoplastic and thermosetting in nature. Utilization of these dual properties results in products of improved physical properties.

18 Claims, No Drawings

POLY(ARYLENE CYANO-THIOETHER) COPOLYMER AND PREPARATION THEREOF

This invention relates to a novel poly(arylene thioether) copolymer and a process for preparation thereof. In particular, the invention relates to a poly(arylene thioether) copolymer Which not only can be thermoplastically formed under suitable forming conditions including temperature condition but also can be thermoset, as well as to the production of such a copolymer.

As regards polymers capable of being cross-linked, various thermosetting resins such as epoxy and phenol resins are known. However, the conventional thermosetting resins generally have low molecular weights and consequently tend to exhibit relatively poor mechanical properties which means that the range of possible applications for them is often restricted. On the other hand, thermoplastic resins are relatively high in molecular weight. although there is generally a problem in that their thermal resistance properties are not always satisfactory when they are put into use.

Thus there has been a great need for the development of new polymeric materials exhibiting thermal resistance properties comparable or superior to those of the conventional thermosetting resins and displaying excellent mechanical properties at raised temperatures.

Examples of thermoplastic resins which have improved thermal resistance properties to a certain extent are disclosed for example in U.S. Pat. No. 3,987,016 and Japanese Patent Public Disclosure (Kokai) Specification No. 62-27429. However the thermal resistance properties of these known materials are still not enough and their solvent resistance properties and mechanical strength properties are not fully satisfactory either.

A poly(phenylene sulfide) carrying electron attractive substituents is described in Japanese Patent Public Disclosure (Kokai) Specification No. 57-90018. However in this polymer the electron attractive substituents are introduced at a level as low as 10 mole % with an aim of thermally stabilizing the polymer and thus making the polymer resistant to cross-linking. Therefore in the above reference, it is not recognized to utilize the functionality of the substituents for rendering the polymer thermosetting and thus giving heat resistant products.

An object of the present invention is to provide a novel polymeric material which can be formed by injection molding technique and which has high heat or thermal resistance properties, good solvent resistance properties and highly improved mechanical properties at raised temperatures.

Another object of the invention is to provide a process for preparing such a novel polymeric material.

A still another object of the invention is to provide articles formed or molded from such a novel polymeric material and postcured by cross-linking the material.

We have made great efforts to achieve these and other incidental objects and, as a result have found that the objects may be favorably achieved by a copolymer comprising a given polymeric arylene thioether in which the backbone chain is constituted by repeating arylene units linked solely via sulfur atoms and in which the backbone chain carries cyano-group pendants at ortho-positions to the backbone-sulfur linkages, said pendants occurring from place to place along the backbone chain.

Accordingly, the present invention provides a poly(arylene thioether) copolymer which comprises a repeating unit of formula (I):

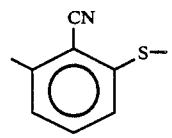

and another repeating unit of formula (II)

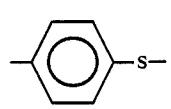

the numbers of the repeating unit (I) in the polymer molecule being m and the number of the repeating unit (II) in the copolymer molecule being n, the value of $m/(m+n)$ ranging from 0.20 to 0.00 the copolymer having a melt viscosity of not less than 50 poises as measured at a temperature of greater 10° C. than the melting point of the copolymer using a nozzle having an internal diameter of 1 mm and a length of 10 mm with a weight load of 10 kg/cm$^2$.

The invention also provides a process for producing a poly(arylene thioether) copolymer which comprises reacting a dihalogenobenzonitrile of formula (III)

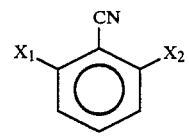

(wherein each $X_1$ and $X_2$, which may be the same or different, represent a halogen atom), a dihalogenobenzene of formula (IV)

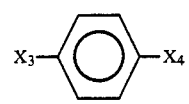

(wherein each $X_3$ and $X_4$, which may be the same or different, represent a halogen atom) and a thioetherifying agent in an organic solvent.

In the present invention it is essential that the backbone of the poly(arylene thioether) copolymer contains an aromatic ring unit onto which a cyano group is directly bonded. This pendant cyano group will effectively act in the cross-linking and curing of the copolymer.

In order to achieve the purpose of the invention, it is also important that the polymar has a value of $m/(m.n)$ within the range of 0.20–0.90, preferably 0.30–0.70 and a melt viscosity of not less than 50 poises preferably not less than 150 poises. If the value of $m/(m+n)$ is less than 0.20. the rate of cross-linking reaction is unacceptably low. On the other hand if the value of $m/(m+n)$ is greater than 0.90, there is a problem that the temperature of crosslinking reaction should be raised to an unacceptably high level. Where the melt viscosity of the polymer is lower than 50 poises there are problems that the physical and mechanical properties of the products are poor.

The term "melt viscosity" herein used with respect to the present polymer means one that is at a temperature of greater 10° C. than the melting point of a particular polymer using a nozzle having an internal diameter of 1 mm and a length of 10 mm with a weight load of 10 kg/cm².

Examples of the dihalogenobenzonitriles which may be used in the invention include 2,6-dichlorobenzonitrile, 2,6-dibromobenzonitrile, 2,6-difluorobenzonitrile, 2-chloro-6-bromobenzonitrile and the like and mixtures thereof.

Examples of the dihalogenobenzenes which may be used in preparation of the present copolymers include p-dichlorobenzene, p-dibromobenzene p-difluorobenzene 1-bromo-4-chlorobenzene, etc.

The thioetherifying agent may be for example an alkali metal sulfide and a combination of a sulfur source with an alkali metal hydroxide.

Examples of such an alkali metal sulfide include lithium, sodium potassium rubidium and cesium sulfides and mixtures thereof. Examples of suitable sulfur sources include alkali metal hydrosulfides thioamide hydrogen-sulfide. sulfide, thiourea, thlocarbamate, thiocarboxylic acids, carbon disulfide, thiocarboxylates, sulfur itself, phosphorous pentasulfide and mixtures thereof. Particular examples of alkali metal hydrosulfides include lithium sodium potassium, rubidium and cesium hydrosulfides and mixtures thereof. Examples of alkali metal hydroxides include potassium sodium lithium and cesium hydroxides and mixtures thereof with sodium hydroxide most preferred.

Generally, synthesis of the present poly(arylene thioether) copolymer comprising (I) and (II) repeating units from the dihalogenobenzonitrile (III). dihalogenobenzene (IV) and thioetherifying agent may be effected in an organic solvent at a raised temperature of about 50°-300° C. preferably about 100°-280° C., for a period of about 1-20 hours. The reaction is preferably carried out with stirring.

The molar ratio of the thioetherifying agent to the total of the dihalogenobenzonitrile and dihalogenobenzene used is in the range of about 0.70 to about 1.30, in particular from 0.90 to 1.10, the most preferably substantially equimolar. Generally the initial concentration of the monomeric starting materials (i.e. both the dihalogeno compounds plus the thioetherifying agent) in the reaction mixture before reaction is selected from the range of from about 100 to about 2000 g per liter of the solvent. Examples of the organic solvent which may be employed in the synthesis process of the poly(arylene thioether) copolymer include amide solvents such as N,N-dimethyl formamide N,N-dimethyl acetamide N-methyl-2-pyrrolidone and the like; and sulfur-containing solvents such as dimethyl sulfoxide, diphenyl sulfone sulfolane and the like.

The present novel poly(arylene thioether) copolymer is thermoplastic in nature and can be thermally shaped or molded like conventional thermoplastic resins. A notable character of the present copolymer material is that the copolymer can be advantageously cross-linked to give cured products. The cross-linking may be effected by heating the copolymer at a temperature of about 100°-400° C. preferably 200°-350° C. for a period of about 5 minutes to about 5 hours. A catalyst may be used for promoting the cross-linking reaction. Use of a catalyst will permit the reaction to be effected using a decreased temperature and/or a reduced process time. Examples of cross-linking catalysts which may be used include Lewis-acid salts, such as anhydrous aluminium chloride. anhydrous zinc chloride and anhydrous ferric chloride; phosphorous compounds, such as phosphorous pentachloride and phosphorous pentoxide: tertiary amines: amine oxides: and hydrocarbyl tin compounds such as tetraphenyl tin.

EXAMPLES

The invention will be further illustrated with reference to the following non-limiting Examples.

EXAMPLE 1

To a 2 1 autoclave, sodium sulfide ($Na_2S \cdot 2.8H_2O$; 90.34 g: 0.70 moles) and N-methyl-2-pyrrolidone (700 ml) were charged and heated with stirring. When heated to 170° C. water present in the mixture started to distill from the autoclave. Subsequently the temperature was raised up to 200° C. and maintained at this temperature until the distillation of water ceased. Thereafter, the reactor was cooled down to a temperature of 100° C. To the cooled reactor. 2,6-dichlorobenzonitrile (36.86 g; 0.21 moles) and p-dichlorobenzene (73.50 g; 0.49 moles) were added. The mixture was heated up to 250° C. with stirring and allowed to react for a period of 3 hours. Thereafter, the reaction mixture was cooled to ambient temperature and poured into one liter of water. The mixture was filtered and washed in turn, with water and methanol.

The product polymer was obtained in a yield of 79.96 g (97%).

Thermal analysis of a sample of the polymer showed that the polymer had a glass transition temperature (Tg) of 80° C., a melting point (Tm) of 248° C. and a thermal decomposition temperature (Td) of 510° C. The thermal analysis was conducted using the differential thermogravimetric (Tg) and differential scanning calorimetric (DSC) methods.

The polymer showed a melt viscosity of 350 poises as measured at a temperature of Tm+10° C. using a nozzle having an internal diameter of 1 mm and a length of 10 mm with a weight load of 10 kg/cm². (The conditions used for determining the melt viscosity will apply any melt viscosity values referred to hereinafter.)

Infrared absorption spectrum (obtained by the KBr tablet method) of the polymer showed a characteristic absorption at 2200 cm$^{-1}$ caused by the nitrile groups and a characteristic absorption 1070 cm$^{-1}$ caused by the thioether linkages of the polymer.

The relative composition m/(m+n) of the copolymer was determined to be a value of 0.28. This determination was made on the basis of the ratio of the absorption peak intensity of nitrile to the absorption peak intensity of thioether observed in the infrared absorption spectrum and using a calibration curve which was specially prepared for this purpose.

EXAMPLE 2

The procedure of the preceding Example 1 was repeated except that the quantities of 2,6-dichlorobenzonitrile and p-dichlorobenzene employed were changed to 26.32 g (0.15 moles) and 82.50 g (0.55 moles), respectively.

Yield of the resulting polymer was 76.69 g (96%).

Thermal analysis of the polymer showed Tg, 80° C.; Tm, 2.66° C. and Td, 530° C. The polymer had a melt viscosity of 400 poises.

Infrared absorption spectrum (by the KBr tablet method) of the polymer showed characteristic absorptions at 2200 cm$^{-1}$ (nitrile) and at 1070 cm$^{-1}$ (thioether). The relative composition m/(m+n) of the product copolymer was determined to be 0.20.

EXAMPLE 3

Sodium sulfide (Na$_2$S.2H$_2$O; 90.34 G; 0.70 moles), 2,6-dichlorobenzonitrile (36.86 g; 0.21 moles), p-dichlorobenzene (73.50 g; 0.49 moles) N-methyl-2-pyrrolidone (700 ml) were charged to a 2 l autoclave and heated to a temperature of 250° C. with stirring and permitted to react for 3 hours at this temperature. After the reaction, the mixture was cooled to ambient temperature and, then, poured into one liter of water. The mixture was filtered and washed with water followed by methanol.

Yield of the resulting polymer was 76.69 g (93%).

Thermal analysis of the polymer showed Tg, 79° C.; Tm, 245° C. and Td, 498° C. The polymer had a melt viscosity of 310 poises.

Infrared absorption spectrum (by the KBr tablet method) of the polymer showed characteristic absorptions at 2200 cm$^{-1}$ (nitrile) and at 1070 cm$^{-1}$ (thioether).

The relative composition m/(m+n) of the product copolymer was determined to be 0.33.

EXAMPLE 4

The procedure of the preceding Example 3 was repeated except that 33.6 g of sodium hydrogensulfide (0.70 moles) in combination with 28.0 g of sodium hydroxide (0.70 moles) was used in place of the sodium sulfilde (Na$_2$S.2H$_2$O; 0.70 moles).

Yield of the resulting polymer was 81.61 g (94%).

Thermal analysis of the polymer showed Tg, 78° C.; Tm, 244° C. and Td, 502° C.

The polymer had a melt viscosity of 210 poises.

Infrared absorption spectrum (by the KBr tablet method) of the polymer showed characteristic absorptions at 2200 cm$^{-1}$ (nitrile) and at 1070 cm$^{-1}$ (thioether).

The relative composition m/(m+n) of the product polymer was determined to be 0.32.

EXAMPLE 5

The procedure of Example 1 was repeated except that the quantities of 2,6-dichlorobenzonitrile and p-dichlorobenzene used were changed to 86.51 g (0.50 moles) and 29.50 g (0.20 moles), respectively.

Yield of the resulting polymer was 89.18 g (98%).

Thermal analysis of the polymer showed Tg, 93° C.; Tm, 322° C. and Td, 542° C.

The polymer had a melt viscosity of 480 poises.

Infrared absorption spectrum (by the KBr tablet method) of the polymer showed characteristic absorptions at 2200 cm$^{-1}$ (—CN) and at 1070 cm$^{-1}$ (-S-; thioether). The relative composition m/(m+n) of the product polymer was determined to be 0.69.

EXAMPLE 6 (CROSS-LINKING)

The polymer as prepared in Example 1 was tested for its cross-linking performance.

A sample of the polymer was dried in a vacuum drier at a temperature of 120° C. and a pressure of 1 mmHg for 5 hours. A portion weighing 10 mg of the dried sample was heated from room temperature to 300° C. at a rate of 10° C./min. under a nitrogen stream in a differential thermogravimeter and allowed to stand at 300° C. for a further 1 hour. During both the heating-up period and the subsequent holding period at 300° C., no weight loss was observed.

Other samples were cross-linked using the above-described heating procedure and tested for solubility properties in various organic solvents. It was found that the thus cross-linked polymer was insoluble in each of 1,1,2,2-tetrachloroethane, p-chlorophenol, dimethyl formamide, dimethyl acetamide, N-methyl-2-pyrrolidone and dimethylsulfoxide. (The uncross-linked polymer was soluble in each of the above-listed solvents.)

EXAMPLE 7 (CROSS-LINKING)

The polymer as prepared in Example 5 was tested for its cross-linking performance.

A sample of the polymer was dried in a vacuum drier at a temperature of 120° C. and a pressure of 1 mmHg for 5 hours. A portion weighing 10 mg of the dried sample was heated from room temperature to 350° C. at a rate of 10° C./min. under a nitrogen steam in a differential thermogravimeter and allowed to stand at 350° C. for a further 1 hour. During both the heating-up period and the holding period at 350° C., no weight loss was observed.

Other samples were cross-linked using the above-described heating procedure and tested for solubility properties in various organic solvents. It was found that the thus cross-linked polymer was insoluble in each of 1,1,2,2-tetrachloroethane, p-chlorophenol, dimethyl formamide, dimethyl acetamide, N-methyl-2-pyrrolidone and dimethyl sulfoxide. The uncross-linked polymer was soluble in each of these organic solvents.

COMPARABLE EXAMPLE

The procedure of Example 1 was repeated except that the quantities of 2,6-dichlorobenzonitrile and p-dichlorobenzene used were changed to 6.58 g (0.04 moles) and 99.37 g (0.66 moles), respectively.

Yield of the resulting polymer was 77.47 g (97%).

Thermal analysis of the polymer showed Tg, 80° C.; Tm, 283° C. and Td, 512° C. The polymer had a melt viscosity of 360 poises.

Infrared absorption spectrum (by the KBr tablet method) of the polymer showed characteristic absorptions at 220 cm$^{-1}$ (nitrile) and at 1070 cm$^{-1}$ (thioether).

The relative composition m/(m+n) of the product copolymer was determined to be 0.05.

The polymer was cross-linked using the heating procedure described in the cross-linking Example 6. No weight loss was observed during the heating-up period and the subsequent holding period at 300° C. The same procedure was used to cross-link the polyymer. The thus cross-linked polymer was found to be soluble in 1,1,2,2-tetrachloroethane, p-chlorophenol, dimethyl formamide dimethyl acetamide N-methyl-2-pyrrolidone and dimethylsulfoxide. The uncross-linked material was soluble in these solvents.

Since the poly(arylene thioether) copolymers according to the present invention exhibit excellent heat resistance properties and are thermoplastic in the nature they may be molded or formed into various articles by the conventional techniques for example by injection molding. In addition the present copolymers behave as thermosetting resin. Therefore they may be cured by cross-linking to give products of excellent solvent and heat resistance properties. Thus, the present copolymers may be advantageously useful in a variety of applications.

What is claimed is:

1. A poly(arylene thioether) copolymer which comprises a repeating unit of formula (I)

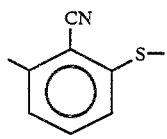

and another repeating unit of formula (II)

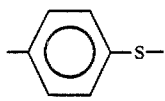

the number of the repeating unit (I) in the polymer molecule being m and the number of the repeating unit (II) in the copolymer molecule being n, the value of m/(m+n) ranging from 0.20 to 0.90, the copolymer having a melt viscosity of not less than 50 poises as measured at a temperature of greater 10 C than the melting point of the copolymer using a nozzle having an internal diameter of 1 mm and a length of 10 mm with a weight load of 10 kg/cm$^2$.

2. A copolymer according to claim 1 wherein the value of m/(m+n) ranges from 0.30 to 0.70.

3. A copolymer according to claim 1 or 2 wherein the melt viscosity is greater than 150 poises.

4. A process for producing a poly(arylene thioether) copolymer which comprises reacting a dihalogenobenzonitrile of formula (III)

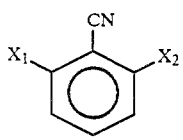

(wherein each $X_1$ and $X_2$, which are the same or different, represent a halogen atom) and a dihalogenobenzene of formula (IV)

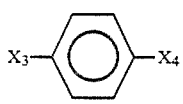

wherein each $X_3$ and $X_4$, which are the same or different, represent a halogen atom, and a thioetherifying agent in an organic solvent.

5. A process according to claim 4 wherein the dihalogenobenzonitrile (III) is selected from the group consisting of 2,6-dichlorobenzonitrile, 2,6-dibromobenzonitrile, 2,6-difluorobenzonitrile and 2-chloro-6-bromobenzonitrile.

6. A process according to claim 4 wherein the dihalogenobenzene (IV) is selected from the group consisting of p-dichlorobenzene, p-dibromobanzene, p-difluorobenzene and 1-bromo-4-chlorobenzene.

7. A process according to claim 4 wherein the thioetherifying agent is an alkali metal sulfide or a sulfur source in combination with an alkali metal hydroxide.

8. A process according to claim 7 wherein the sulfur source is selected from the group consisting of alkali metal hydrosulfides, thioamide hydrogensulfide, thiourea, thiocarbamates, thiocarboxylic acids, carbon disulfide. thiocarboxylates, sulfur and phosphorous pentasulfide, and the alkali metal hydroxide is selected from the group consisting of potassium, sodium lithium and cesium hydroxides.

9. A process according to claim 8 wherein the alkali metal hydrosulfide is lithium sodium potassium, rubidium or cesium sulfide.

10. A process according claim 4 wherein the reaction is effected at a temperature of about 50°-300° C. for a period of about 1 to 20 hours.

11. A process according to claim 10 wherein the temperature ranges from about 100+ to 280° C.

12. A process according to claim 4 wherein the molar ratio of the thioetherifying agent to the total of the dihalogenobenzonitrile and dihalogenobenzene used is in the range of about 0.70–1.30.

13. A process according to claim 12 wherein the molar ratio is in the range of about 0.90–1.10.

14. A process according to claim 4 wherein three monomeric materials comprising the dihalogenobenzonitrile dihalogenobenzene and thioetherifying agent are present in a total concentration of about 100–2000 g per liter of the organic solvent before commencement of the reaction.

15. An article molded or formed from the copolymer according to claim 1.

16. A copolymer according to claim 1 which has a melting point in the range of 244° C. to 322° C.

17. A process according to claim 4, wherein the poly(arylene thioether) copolymer has a melting point of from 244° C. to 322° C.

18. A molded article according to claim 15, wherein the copolymer has a melting point of 244°–322° C.

* * * * *